United States Patent

Maatman et al.

[11] Patent Number: 5,856,004
[45] Date of Patent: Jan. 5, 1999

[54] CELLULOSE YARN AND CORD FOR INDUSTRIAL APPLICATION

[75] Inventors: Hendrik Maatman; Egbert Wilhelmus Christinus Broeren; Frederik Elkink, all of Arnhem, Netherlands

[73] Assignee: Akzo Nobel NV, Arnhem, Netherlands

[21] Appl. No.: 913,403

[22] PCT Filed: Mar. 19, 1996

[86] PCT No.: PCT/EP96/01231

§ 371 Date: Sep. 17, 1997

§ 102(e) Date: Sep. 17, 1997

[87] PCT Pub. No.: WO96/30222

PCT Pub. Date: Oct. 3, 1996

[30] Foreign Application Priority Data

Mar. 31, 1995 [NL] Netherlands ............ 9500629

[51] Int. Cl.⁶ ............................................. D02G 3/00
[52] U.S. Cl. ...................................... 428/364; 428/393
[58] Field of Search ........................ 428/364, 357, 428/393; 536/56

[56] References Cited

U.S. PATENT DOCUMENTS

| | | | |
|---|---|---|---|
| 4,464,323 | 8/1984 | O'Brien | 264/187 |
| 4,839,113 | 6/1989 | Villaine et al. | 264/28 |
| 4,926,920 | 5/1990 | Goattebessis et al. | 152/548 |
| 5,571,468 | 11/1996 | Meraldi et al. | 264/187 |

FOREIGN PATENT DOCUMENTS

| | | | |
|---|---|---|---|
| 220 642 | 5/1987 | European Pat. Off. | B60C 9/00 |
| 179 822 | 3/1988 | European Pat. Off. | C08L 1/10 |
| WO 94/17136 | 8/1994 | WIPO | C08L 1/10 |
| WO 9606207 | 2/1996 | WIPO | D01F 2/02 |
| WO 9606208 | 2/1996 | WIPO | D01F 2/02 |

*Primary Examiner*—Newton Edwards
*Attorney, Agent, or Firm*—Louis A. Morris

[57] ABSTRACT

The invention is directed to a cellulose filament yarn having a breaking tenacity of higher than 600 mN/tex and containing more than 400 filaments and a cord made therefrom.

20 Claims, No Drawings

CELLULOSE YARN AND CORD FOR INDUSTRIAL APPLICATION

The invention relates to a cellulose filament yarn for industrial application with a breaking tenacity of higher than 600 mN/tex and containing more than 400 filaments.

Such a yarn is known from EP 0 220 642-A1, which publication discloses a cellulose yarn suitable for use as a reinforcing material in pneumatic tires. This yarn can be made by spinning an optically anisotropic solution of cellulose formate in phosphoric acid, followed by regeneration of the cellulose formate yarn. The resulting yarn has a morphology which appears to be built up of layers embedded in each other which surround the axis of the filament, and which besides varies pseudoperiodically along the axis of the filament. EP 0 179 822-A1 likewise discloses a cellulose yarn having a morphology with a similar pseudoperiodical variation along the axis of the filament. This morphology can be made visible with a polarisation microscope. According to the latter publication, the filaments of such a yarn have a sheath/core structure. According to WO 94/17136, the morphology is connected with the anisotropic solution from which the filaments are obtained. Sheath/core structures may give rise to high fibre fibrillation, especially in the case of fibres of great stiffness. As stated in WO 94/17136, this fibrillation can occur when such a filament is passed along a rough surface. This may give rise to processing problems, e.g., when processing a yarn made up of such filaments for use as a reinforcing material, for instance as the yarn is corded, when fibrillation can lead to the formation of fluff, which, in its turn, can lead to an irregular cord of lower cord strength being made.

U.S. Pat. No. 4,464,323 discloses a cellulose filament yarn of 40 filaments, the individual filaments having a high breaking tenacity (>1000 mN/tex). The filaments are made by spinning an anisotropic solution. However, since the number of filaments is very low and the preparative process for the yarn is so complex as to preclude production on an economically advantageous scale, the yarn is not suitable for use on an industrial scale.

It is clear from the above-mentioned publications that cellulose filaments of high strength can be obtained by spinning an anisotropic, cellulose-containing solution.

At the moment, the only commercially available cellulose yarns for industrial applications are those made via the viscose process. Such yarns generally contain 1000 or more filaments and have a breaking tenacity in the range of 400 to 550 mN/tex. Such yarns generally have a modulus of elasticity, characterised by their tenacity at an elongation of 1% (TASE 1%), of less than 100 mN/tex. These yarns are made by spinning an optically isotropic solution, and the morphology of the filaments does not vary pseudoperiodically along the axis of the filament.

For a number of applications of a cellulose yarn as a reinforcing material, the yarn is processed into a cord. Such cords usually contain two or three intertwined twisted yarns. In actual practice, the twist factor serves as a measure of the number of turns of a yarn in a cord structure. The twist factor can be calculated from the weight per unit length of the cord (the so-called linear density) and the number of turns in the cord per unit length. The twist factor increases as during cord manufacture from one and the same type of yarn the number of turns per unit length increases. When making a cord from twisted yarns, the yarns generally are intertwined in such a way as will result in the number of turns per unit length in the cord being the same as the number of turns per unit length in the yarn of which the cord is built up, with the proviso that the direction in which the twisted yarns are intertwined is opposite to the direction of twist of the yarns. In such a way a so-called symmetrical cord is formed. Alternatively, an asymmetrical cord can be formed.

It was found that the breaking force of a cord of cellulose yarns made in such a way decreases as the twist factor increases. However, the twist factor was also found to affect the fatigue resistance due to dynamic compression load (fatigue) on the cords. In general, in the so-called GBF (Goodrich Block Fatigue) test there is an increase in fatigue as the twist factor increases.

If the use of cellulose yarn as a reinforcing material involves its potential exposure to dynamic load, as for instance when it is used as a reinforcing material in a pneumatic tire, the twist factor in the cord as a rule will be one where the cord displays good fatigue and has a sufficiently high breaking force. In actual practice, it was found that a nominal twist factor of from 180 to 280 is employed for cords in tires for passenger cars.

The breaking force of the cord at a twist factor of 200 can be used as a measure indicating the yarn's practical applicability. Cellulose yarns for industrial applications made by the viscose process generally have a cord strength (i.e., a cord breaking tenacity) at a twist factor of 200 of not more than 400 mN/tex.

Cellulose yarns for industrial application with a higher yarn strength and cord strength have been wanted for a long time. The yarn according to the invention satisfies this need.

The invention consists of a yarn of the type described in the opening paragraph which can be made into a cord having a breaking tenacity greater than 450 mN/tex at a twist factor of 200, with the filaments of which the yarn is built up having a morphology which does not vary pseudoperiodically along the axis of the filament.

Such a cellulose filament yarn can be obtained by spinning an optically anisotropic solution of cellulose in phosphoric acid containing at least 8 wt. %, of cellulose. It is preferred that the solution contain of from 10 to 30 wt. % of cellulose, preferably of from 12.5 to 25 wt. %, more particularly of from 15 to 23 wt. % of cellulose. Such a solution can be obtained by combining cellulose and a solvent containing water and inorganic acids of phosphorus and/or their anhydrides in an apparatus in which intensive mixing is made possible by the shearing forced generated by the mixers and kneaders in the apparatus, with 94–100 wt. % of the constituents of the solution being made up of cellulose, inorganic acids of phosphorus and/or their anhydrides and water. The solvent is made up of 65–80 wt. % of phosphorus pentoxide and residual water calculated on the overall quantity by weight of inorganic acids of phosphorus, their anhydrides, and water.

The solution can then by spun by a so-called air gap spinning process, in which the solution is forced through a spinneret and the extrudates are passed through an air gap and then coagulated in a coagulant having a temperature below 20° C., the coagulant being, e.g., acetone.

The thus obtained yarn can then be washed out, e.g., with water, dried, and wound. Immediately following on from the washing step the resulting yarn can be neutralised. The neutralising agent used may be, int. al., NaOH, KOH, LiOH, $NaHCO_3$, $Na_2CO_3$, $NH_4OH$, sodium ethanolate, or sodium methanolate. After the washing and neutralisation steps the fibres preferably contain the lowest possible amount of residual phosphorus (P).

Such a process has also been described in patent applications WO 96/06207 and WO 96/6208 in the name of applicant.

In order to be suitable for use in technical applications, the yarn according to the invention contains more than 400 filaments, preferably more than 500 filaments, more particularly more than 1000 filaments. Yarns containing more than 1000 filaments can be made up of several yarns. For instance, a yarn containing 1500 filaments can be made by combining 4 yarns each containing 375 filaments, e.g., through rewinding. However, this is not the preferred way of obtaining the yarn. Preferably, yarns containing the desired number of filaments are spun in one step. The number of filaments is significant for technical applications in particular, since in those cases it is not only the breaking tenacity (in mN/tex) of the yarn which is important, but also the absolute breaking force (in N). For instance, a yarn having a breaking tenacity of 750 mN/tex which is made of 50 filaments having an average linear density of 1.6 dtex will have an absolute breaking force of 6,0 N. A yarn of the same breaking tenacity made of 1500 filaments of an average linear density of 1.6 dtex will have an absolute breaking force of 180 N.

The yarn according to the invention has a breaking tenacity of at least 600 mN/tex, but preferably of more than 750 mN/tex, more particularly of more than 850 mN/tex.

Cord made of the yarn according to the invention has a breaking tenacity at a twist factor of 200 of at least 450 mN/tex, but preferably of more than 500 mN/tex.

In addition to having a higher breaking tenacity, cord made of the yarn according to the invention was found to have a higher modulus of elasticity (characterised by TASE 1%) than cords made of well-known cellulose yarns for industrial application. Cord made of the yarn according to the invention has a TASE 1% at a twist factor of 200 of at least 30 mN/tex, more particularly of more than 35 mN/tex.

The yarn according to the invention can be used as reinforcing material in articles which can be subjected to dynamic, mechanical load, e.g., hose, V-belts, conveyor belts, and vehicle tires. The high breaking tenacity and the high modulus make the yarn especially suited for use as reinforcing material in a hose. Due to the favourable properties of a cord which is made from the yarn, the yarn is also very suitable for use as reinforcing material in vehicle tires such as car, truck, and airplane tires. The yarn is pre-eminently suited to be used as reinforcing material in the carcass of a vehicle tire. The yarn constitutes an alternative to those yarn which are presently used for technical applications, such as polyamide yarn, polyester yarn, aramid yarn, and rayon.

If the yarn is used as reinforcing material in rubber articles which may be subjected to a dynamic, mechanical load, it is generally used in the form of a cord. This cord can be treated with a dispersion of a resorcinol formaldehyde latex (RFL) in water in order to improve the rubber's adhesion to the yarn. Alternatively, the yarn or cord can be processed into a fabric prior to being treated with the RFL dispersion, in which case the fabric can then be treated with an RFL dispersion.

Processed into a cord and treated with an RFL dispersion, the yarn according to the invention displays especially good adhesion to rubber. This adhesion is such that in the so-called "pull-out" test, pulling a treated cord from a small rubber block, the cord sometimes breaks outside the rubber block. In the case of poorer adhesion between the treated cord and the rubber, the treated cord will be pulled from the rubber block in so-called "pull-out" tests. The "pull-out" test can be performed in accordance with ASTM D 2229-93a (Standard test method for adhesion between steel tire cords and rubber), with a cord made of the yarn according to the invention being employed instead of steel cord.

The strength of the yarn according to the invention was also found not to be very dependent on the moisture content. It is well-known (see, e.g., Morton & Hearle, *Physical properties of textile fibres* (1962), p. 296) that the strength of artificial cellulose fibres decreases with an increasing moisture content. For instance, yarn made by the viscose process has about 30% lower strength at 65% RH than the same yarn in the dry state. The breaking force of the yarn according to the invention is far less sensitive to moisture. The breaking force at 65% RH is about equal to the breaking load in the dry state.

Measuring Methods

The mechanical properties of the yarn and the cord can be determined as specified by BISFA (The International Bureau for the Standardisation of Man-made Fibres, *Internationally agreed methods for testing viscose, cupro, acetate and triacetate filament yarns,* 1984 edition), with the aid of a dynamometer, e.g., an Instron dynamometer. The yarns and cords were measured after one hour's drying at 50° C. followed by at least 16 hours of conditioning at 20° C., 65% RH. The mechanical properties were determined using a gauge length of 500 mm and a rate of elongation of 50%/min. The linear density of prior art products was determined by weighing the bone dry product and increasing the thus determined linear density by 12,5%. The linear density of the yarn and the cord according to the invention was determined by weighing the conditioned product.

When determining the properties of a cord treated with an RFL dispersion, the linear density should be corrected for dip pick up (DPU). The dip pick up can be determined in accordance with the aforementioned BISFA standard.

The twist factor of a symmetrical cord structure is determined as follows:

$$\text{Twist factor} = N^* \sqrt{(LD_{cord} * 10^{-1}/\rho)}$$

wherein

N is the number of turns per meter in the cord, $LD_{cord}$ is the linear density of the greige cord (in dtex), and $\rho$ is the yarn density (for yarn based on cellulose 1520 kg/m$^3$).

The nominal twist factor can be calculated from the nominal linear density of the cord instead of the actual linear density ($LD_{cord}$).

The invention will be further illustrated with reference to the following, unlimitative examples.

Example 1

In a Linden-Z kneader 13,000 g of orthophosphoric acid (99.6% H$_3$PO$_4$) were melted and kneaded at 34°–40° C. until a clear, viscous liquid was obtained. To this liquid 3,300 g of polyphosphoric acid were added. After 90 minutes of homogenising at 40° C. the mixture was cooled to 7° C. and 3,600 g of powdered cellulose (DP=700) were added. The mixture was kneaded for 30 minutes (the last 20 of these in vacuo) until a homogenous solution was obtained. This solution was passed through several spinning pumps to a spinning assembly. The solution was spun at 58° C. through a spinneret with 375 capillaries having a diameter of 65 μm each, via an air gap of 40 mm, into a coagulation bath containing acetone at a temperature of +12° C. The draw ratio in the air gap was about 7. Next, the yarn was washed and neutralised. After neutralisation the yarn was washed again, finish was applied, the yarn was dried and wound onto a bobbin. In this way four bobbins with yarn were made. In the filaments of which the yarns were built up, a pseudoperiodical variation of the morphology along the axis of the filaments was not observed. A yarn of 1500 filaments in all was made by rewinding these four bobbins. The mechanical properties of this yarn are listed in Table I.

A Lezzeni down-down ring twisting machine was used to process this yarn with a linear density of about 2440 dtex into 2440dtex×Z×2 S greige cord structures of different twist factors. The mechanical properties of the thus formed cords were measured, and the results are listed in Table II.

Next, the cords were passed through a dipping bath filled with a dispersion of 20 wt. % of resorcinol formaldehyde latex in water and then dried in a hot air oven for 120 seconds at a temperature of 175° C. and a force of 6N.

The thus formed dipped cords also had their mechanical properties measured. The results are listed in Table III.

Example 2

In a Werner & Pfleiderer ZSK 30 twin-screw extruder a solution was prepared continuously using cellulose and a solvent containing inorganic acids of phosphorus. In the transport direction of the twin-screw extruder six pairs of heating elements each of about 7,5 cm in length were arranged. These pairs of heating elements permit the setting of six different temperature zones in the transport direction of the extruder. In the first zone (zone 1) immediately beyond the throat of the twin-screw extruder a temperature of 0° C. was set. In the following zone (zone 2) a temperature of 10° C. was set. In the four subsequent zones (zones 3, 4, 5, and 6) a temperature of 20° C. was set. Moreover, zone 4 and parts of zones 5 and 6 were kept under reduced pressure (20–40 mbar). The temperature of the heating element near the endplate of the extruder was set to 15°–17° C. Powdered cellulose, Buckeye V60, DP 850, was added via the extruder throat at a feeding rate of 1,5 kg/h. Via the first heating element in zone 1 a liquid mixture comprising 74,4 wt. % $P_2O_5$ (phosphorus pentoxide), which mixture was obtained by mixing and homogenizing 80 wt. % of $H_3PO_4$ (orthophosphoric acid) and 20 wt. % of PPA (polyphosphoric acid, ex Stokvis) during several hours at 60° C., was charged at a feeding rate of 6,8 kg/h. The extruder screws were operated at 300 rpm. The obtained anisotropic solution contained less than 1 wt. % (related to the total amount of cellulose in the solution) of undissolved particles. Using several spinning pumps this solution was passed through several filters to a cluster spinning assembly via a conveying pipe at a temperature between 20° C. and 30° C. Just before entering the spinneret the solution was heated to 52° C. This solution was spun through the spinning assembly with 4×375 capillaries each of a diameter of 65 μm, via an air gap of 40 mm, into a coagulation bath containing acetone at a temperature of +7° C. The draw ratio in the air gap was about 7. Next, the yarn was washed with water using jet washers, neutralised in a 2,5 wt. % $Na_2CO_3$ solution, washed again, finished, dried and wound onto a bobbin. In the filaments of which the yarn was built up, a pseudoperiodical variation of the morphology along the axis of the filaments was not observed. The mechanical properties of the thus obtained yarn are listed in Table I.

A Lezzeni down-down ring twisting machine was used to process this yarn with a linear density of about 2550 dtex into 2550dtex×Z×2 S greige cord structures of different twist factors. The mechanical properties of the thus formed cords were measured, and the results are listed in Table II.

Next, the cords were passed through a dipping bath filled with a dispersion of 20 wt. % of resorcinol formaldehyde latex in water and then dried in a hot air oven for 120 seconds at a temperature of 175° C. and a force of 6N. The thus formed dipped cords also had their mechanical properties measured. The results are listed in Table III.

Example 3

In a Werner & Pfleiderer ZSK 30 twin-screw extruder as described in Example 2, a solution was prepared continuously using cellulose and a solvent containing inorganic acids of phosphorus. Powdered cellulose, Buckeye V60, DP 850, was added via the extruder throat at a feeding rate of 1,5 kg/h. Via the first heating element in zone 1 a liquid mixture comprising 74,4 wt. % $P_2O_5$ (phosphorus pentoxide), which mixture was obtained by mixing and homogenizing 80 wt. % of $H_3PO_4$ (orthophosphoric acid) and 20 wt. % of PPA (polyphosphoric acid, ex Stokvis) during several hours at 60° C., was charged at a feeding rate of 6,8 kg/h. The extruder screws were operated at 300 rpm. The obtained anisotropic solution contained less than 1 wt. % of undissolved particles. Using several spinning pumps this solution was passed through several filters to a cluster spinning assembly via a conveying pipe at a temperature between 15° C. and 25° C. Just before entering the spinneret the solution was heated to 59° C. This solution was spun through the spinning assembly with 4×375 capillaries each of a diameter of 65 μm, via an air gap of 45 mm, into a coagulation bath containing acetone at a temperature of +12° C. The draw ratio in the air gap was about 7. Next, the yarn was washed with water using jet washers, neutralised in a 2,5 wt. % $Na_2CO_3$ solution, washed again, finished, dryed and wound onto a bobbin. In the filaments of which the yarn was built up, a pseudoperiodical variation of the morphology along the axis of the filaments was not observed. The mechanical properties of the thus obtained yarn are listed in Table I.

A Lezzeni down-down ring twisting machine was used to process this yarn with a linear density of about 2450 dtex into a 2450dtex×Z×2 S greige cord structure with a twist factor of about 200. The mechanical properties of the thus formed cord were measured, and the results are listed in Table II.

Next, the cord was passed through a dipping bath filled with a dispersion of 20 wt. % of resorcinol formaldehyde latex in water and then dried in a hot air oven for 120 seconds at a temperature of 175° C. and a force of 6N. The thus formed dipped cord also had its mechanical properties measured. The results are listed in Table III.

Example 4

In a Werner & Pfleiderer ZSK 30 twin-screw extruder as described in Example 2, a solution was prepared continuously using cellulose and a solvent containing inorganic acids of phosphorus. Powdered cellulose, Buckeye V60, DP 850, was added via the extruder throat at a feeding rate of 1,5 kg/h. Via the first heating element in zone 1 a liquid mixture comprising 74,4 wt. % $P_2O_5$ (phosphorus pentoxide), which mixture was obtained by mixing and homogenizing 80 wt. % of $H_3PO_4$ (orthophosphoric acid) and 20 wt. % of PPA (polyphosphoric acid, ex Stokvis) during several hours at 60° C., was charged at a feeding rate of 6,8 kg/h. The extruder screws were operated at 300 rpm. The obtained anisotropic solution contained less than 1 wt. % of undissolved particles. Using several spinning pumps this solution was passed through several filters to a cluster spinning assembly via a conveying pipe at a temperature between 15° C. and 25° C. Just before entering the spinneret the solution was heated to 63° C. This solution was spun through the spinning assembly with 4×375 capillaries each of a diameter of 65 μm, via an air gap of 45 mm, into a coagulation bath containing acetone at a temperature of +13° C. The draw ratio in the air gap was about 7. Next, the yarn was washed with water using jet washers, neutralised in a 2,5 wt. % $Na_2CO_3$ solution, washed again, finished, dryed and wound onto a bobbin. In the filaments of which the yarn was built up, a pseudoperiodical variation of the morphology along the axis of the filaments was not observed.

The mechanical properties of the thus obtained yarn are listed in Table I.

A Lezzeni down-down ring twisting machine was used to process this yarn with a linear density of about 2550 dtex into a 2550dtex×Z×2 S greige cord structure with a twist factor of about 200.

The mechanical properties of the thus formed cord were measured, and the results are listed in Table II.

Next, the cord was passed through a dipping bath filled with a dispersion of 20 wt. % of resorcinol formaldehyde latex in water and then dried in a hot air oven for 120 seconds at a temperature of 175° C. and a force of 6N.

The thus formed dipped cord also had its mechanical properties measured. The results are listed in Table III.

Example 5

In a Werner & Pfleiderer ZSK 30 twin-screw extruder as described in Example 2, a solution was prepared continuously using cellulose and a solvent containing inorganic acids of phosphorus. Powdered cellulose, Buckeye V60, DP 850, was added via the extruder throat at a feeding rate of 1,5 kg/h. Via the first heating element in zone 1 a liquid mixture comprising 74,4 wt. % $P_2O_5$ (phosphorus pentoxide), which mixture was obtained by mixing and homogenizing 80 wt. % of $H_3PO_4$ (orthophosphoric acid) and 20 wt. % of PPA (polyphosphoric acid, ex Stokvis) during several hours at 60° C., was charged at a feeding rate of 6,8 kg/h. The extruder screws were operated at 300 rpm. The obtained anisotropic solution contained less than 1 wt. % of undissolved particles. Using several spinning pumps this solution was passed through several filters to a cluster spinning assembly via a conveying pipe at a temperature between 15° C. and 25° C. Just before entering the spinneret the solution was heated to 61° C. This solution was spun through the spinning assembly with 4×375 capillaries each of a diameter of 65 μm, via an air gap of 45 mm, into a coagulation bath containing acetone at a temperature of +12° C. The draw ratio in the air gap was about 7. Next, the yarn was washed with water using jet washers, neutralised in a 0,5 wt. % NaOH solution, washed again, finished, dryed and wound onto a bobbin. In the filaments of which the yarn was built up, a pseudoperiodical variation of the morphology along the axis of the filaments was not observed. The mechanical properties of the thus obtained yarn were measured according to ASTM D2256-90 as described in WO 96/06208. The main properties are listed in Table I. The initial modulus of the yarn was 18,5 N/tex and the breaking toughness 31,6 J/g. Indiviual filaments of yarns spun in a similar way showed a breaking tenacity of 1220 mN/tex, an elongation at break of 7,6%, and a breaking toughness of 44 J/g.

Example 6

In a Werner & Pfleiderer ZSK 30 twin-screw extruder as described in Example 2, a solution was prepared continuously using cellulose and a solvent containing inorganic acids of phosphorus. Powdered cellulose, Buckeye V60, DP 850, was added via the extruder throat at a feeding rate of 1,5 kg/h. Via the first heating element in zone 1 a liquid mixture comprising 74,4 wt. % $P_2O_5$ (phosphorus pentoxide), which mixture was obtained by mixing and homogenizing 80 wt. % of $H_3PO_4$ (orthophosphoric acid) and 20 wt. % of PPA (polyphosphoric acid, ex Stokvis) during several hours at 60° C., was charged at a feeding rate of 6,8 kg/h. The extruder screws were operated at 300 rpm. The obtained anisotropic solution contained less than 1 wt. % of undissolved particles. Using several spinning pumps this solution was passed through several filters to a cluster spinning assembly via a conveying pipe at a temperature between 15° C. and 25° C. Just before entering the spinneret the solution was heated to 62° C. This solution was spun through the spinning assembly with 4×375 capillaries each of a diameter of 65 μm, via an air gap of 45 mm, into a coagulation bath containing acetone at a temperature of +12° C. The draw ratio in the air gap was about 7,5. Next, the yarn was washed with water using jet washers, neutralised in a 2,5 wt. % $Na_2CO_3$ solution, washed again, finished, dryed and wound onto a bobbin. In the filaments of which the yarn was built up, a pseudoperiodical variation of the morphology along the axis of the filaments was not observed. The mechanical properties of the thus obtained yarn were measured according to ASTM D2256-90 as described in WO 96/06208. The main properties are listed in Table I. The initial modulus of the yarn was 24,1 N/tex and the breaking toughness 30,8 J/g.

Comparative Example

Two commercially available types of cellulose yarns for technical application (Cordenka 660® and Cordenka 700®) as well as one such type of cellulose yarn which is no longer available (Cordenka EHM®) were subjected to the same maeasurements and treatments as the yarn in Example 1, with the proviso that there was no need to rewind these yarns in order to obtain a yarn having a sufficiently high number of filaments. (®: registered trademarks of Akzo Nobel).

TABLE I

Mechanical properties of the yarns

|  | Yarn linear density (dtex) | number of filaments | Breaking tenacity (mN/tex) | Elongat. at break (%) | TASE 1% (mN/tex) |
| --- | --- | --- | --- | --- | --- |
| Example 1 | 2446 | 1500 | 902 | 6.4 | 203 |
| Example 2 | 2570 | 1500 | 790 | 6.6 | 173 |
| Example 3 | 2468 | 1500 | 893 | 6.6 | 183 |
| Example 4 | 2512 | 1500 | 904 | 6.6 | 185 |
| Example 5 | 2570 | 1500 | 882 | 7,4 | 137 |
| Example 6 | 2358 | 1500 | 960 | 6,4 | 160 |
| Cordenka 660 | 1846 | 1000 | 425 | 13.7 | 88.5 |
| Cordenka 700 | 2480 | 1350 | 485 | 11.1 | 100 |
| Cordenka EHM | 1868 | 1500 | 596 | 4.7 | 182.5 |

TABLE II

Mechanical properties of greige cords

|  | N (tpm) | Twist factor | Breaking tenacity (mN/tex) | Elongat. at break (%) | TASE 1% (mN/tex) |
| --- | --- | --- | --- | --- | --- |
| Example 1 | 295 | 174 | 567 | 8.0 | 50.5 |
|  | 333 | 198 | 513 | 8.4 | 39.9 |
|  | 359 | 215 | 470 | 8.7 | 32.0 |
|  | 392 | 237 | 422 | 9.6 | 23.3 |
| Example 2 | 300 | 183 | 556 | 9.8 | 34.0 |
|  | 330 | 203 | 500 | 9.8 | 33.0 |
|  | 362 | 225 | 435 | 10.9 | 21.0 |
|  | 395 | 249 | 397 | 12.0 | 16.0 |
| Example 3 | 326 | 200 | 560 | 9.6 | 31.0 |
| Example 4 | 327 | 200 | 562 | 9.6 | 30.0 |

TABLE II-continued

Mechanical properties of greige cords

|  | N (tpm) | Twist factor | Breaking tenacity (mN/tex) | Elongat. at break (%) | TASE 1% (mN/tex) |
|---|---|---|---|---|---|
| Cordenka 660 | 358 | 188 | 347 | 18.9 | 29.7 |
|  | 430 | 233 | 301 | 20.4 | 20.5 |
| Cordenka 700 | 299 | 177 | 419 | 16.4 | 32.4 |
|  | 331 | 198 | 403 | 17.1 | 29.2 |
|  | 355 | 213 | 378 | 17.6 | 25.1 |
|  | 392 | 238 | 353 | 18.6 | 20.9 |
| Cordenka EHM | 355 | 191 | 402 | 8.2 | 27.0 |
|  | 423 | 226 | 334 | 9.8 | 17.0 |

TABLE III

Mechanical properties of dipped cords

|  | N (tpm) | Twist factor | Breaking tenacity (mN/tex) | Elongat. at break (%) | TASE 1% (mN/tex) |
|---|---|---|---|---|---|
| Example 1 | 295 | 174 | 567 | 7.0 | 92.0 |
|  | 333 | 198 | 514 | 7.0 | 79.0 |
|  | 359 | 215 | 489 | 7.3 | 69.0 |
|  | 392 | 237 | 431 | 7.6 | 58.0 |
| Example 2 | 300 | 183 | 580 | 7.5 | 100.0 |
|  | 330 | 203 | 517 | 7.5 | 88.0 |
|  | 362 | 225 | 461 | 7.8 | 73.0 |
|  | 395 | 249 | 400 | 7.6 | 60.0 |
| Example 3 | 326 | 200 | 545 | 7.3 | 89.6 |
| Example 4 | 327 | 200 | 575 | 7.8 | 85.5 |
| Cordenka 660 | 358 | 188 | 338 | 14.3 | 55.5 |
|  | 430 | 233 | 288 | 14.9 | 41.6 |
| Cordenka 700 | 299 | 177 | 399 | 16.1 | 54.0 |
|  | 331 | 198 | 376 | 16.1 | 48.5 |
|  | 355 | 213 | 353 | 16.3 | 43.9 |
|  | 392 | 238 | 328 | 16.3 | 40.2 |
| Cordenka EHM | 374 | 191 | 392 | 5.7 | 85.2 |
|  | 422 | 226 | 351 | 6.2 | 67.9 |

The data in Table II for examples 1 and 2 and for the Cordenka cords have been interpolated to determine the breaking tenacity and the TASE 1% of the cord at a twist factor of 200. These interpolated values are listed in Table IV.

TABLE IV

Breaking force and modulus of elasticity of greige cords at a twist factor of 200

|  | Breaking tenacity (mN/tex) | TASE 1% (mN/tex) |
|---|---|---|
| Example 1 | 508 | 39.0 |
| Example 2 | 508 | 33.2 |
| Example 3 | 560 | 31.0 |
| Example 4 | 562 | 30.0 |
| Cordenka 660 | 335 | 27.2 |
| Cordenka 700 | 400 | 28.7 |
| Cordenka EHM | 385 | 24.4 |

We claim:

1. Cellulose filament-yarn for technical application having a breaking tenacity of higher than 600 mN/tex and containing more than 400 filaments wherein said yarn can be made into a cord having a breaking tenacity of higher than 450 mN/tex at a twist factor of 200, said filaments having a morphology which does not vary pseudoperiodically along the axis of said filaments.

2. The cellulose yarn of claim 1 wherein said cord has a breaking tenacity of higher than 500 mN/tex at a twist factor of 200.

3. The cellulose yarn of claim 1 wherein said yarn contains more than 500 filaments.

4. The cellulose yarn of claim 3 wherein said yarn contains more than 1000 filaments.

5. The cellulose yarn of claim 1 wherein said yarn has a breaking tenacity of higher than 750 mN/tex.

6. The cellulose yarn of claim 5 wherein said yarn has a breaking tenacity of higher than 850 mN/tex.

7. The cellulose yarn of claim 1 wherein a cord made of the yarn has a modulus of elasticity, characterised by TASE 1%, of higher than 30 mN/tex at a twist factor of 200.

8. The cellulose yarn of claim 7 wherein said cord has a modulus of elasticity of higher than 35 mN/tex at a twist factor of 200.

9. A cord containing more than 400 filaments of a cellulose filament yarn for technical applications wherein said cord has a breaking tenacity of higher than 450 mN/tex at a twist factor of 200, and the cellulose filaments have a morphology which does not vary pseudoperiodically along the axis of the filaments, said yarn being the yarn of claim 1.

10. The cord of claim 9 wherein said cord has a breaking tenacity of higher than 500 mN/tex at a twist factor of 200.

11. The cord of claim 9 wherein said yarn contains more than 500 filaments.

12. The cord of claim 11 wherein said yarn contains more than 1000 filaments.

13. The cord of claim 9 wherein the modulus of elasticity, characterised by TARE 1%, is higher than 30 mN/tex at a twist factor of 200.

14. The cord of claim 13 wherein the modulus of elasticity is higher than 35 mN/tex at a twist factor of 200.

15. A vehicle tire comprising the cellulose yarn of claim 1.

16. A reinforcing material comprising the cord of claim 9.

17. A rubber article which can be subjected to a mechanical, dynamic load comprising the reinforcing material of claim 16.

18. A vehicle tire comprising the rubber article of claim 17.

19. A carcass of a vehicle tire comprising the cord of claim 9 as reinforcing material.

20. A hose comprising the yarn of claim 1 as reinforcing material.

* * * * *

UNITED STATES PATENT AND TRADEMARK OFFICE
CERTIFICATE OF CORRECTION

PATENT NO. : 5,856,004
DATED : January 5, 1999
INVENTOR(S) : Maatman, H., et al.

It is certified that error appears in the above-indentified patent and that said Letters Patent is hereby corrected as shown below:

In claim 1, line 1 please change "filament-yarn" to "filament yarn".

Signed and Sealed this

Twenty-fifth Day of May, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,856,004
DATED : January 5, 1999
INVENTOR(S) : Hendrik Maatman; Egbert Wilhelmus Christinus Broeren
Frederik Elkink It is certified that error appears in the above-indentified patent and that said Letters Patent is hereby corrected as shown below:

In claim 13, line 42, please change the word "TARE" to read as "TASE".

Signed and Sealed this

Twenty-fourth Day of August, 1999

Attest:

Q. TODD DICKINSON

Attesting Officer     Acting Commissioner of Patents and Trademarks